United States Patent
Goto et al.

(10) Patent No.: US 10,323,632 B2
(45) Date of Patent: Jun. 18, 2019

(54) LUBRICATING OIL SUPPLY DEVICE AND LUBRICATING OIL SUPPLY CONTROL METHOD FOR VEHICLE

(71) Applicant: TOYOTA JIDOSHA KABUSHIKI KAISHA, Toyota-shi, Aichi-ken (JP)

(72) Inventors: Kaoru Goto, Toyota (JP); Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 15/628,752

(22) Filed: Jun. 21, 2017

(65) Prior Publication Data
US 2018/0010595 A1    Jan. 11, 2018

(30) Foreign Application Priority Data

Jul. 6, 2016 (JP) ................................. 2016-133978

(51) Int. Cl.
| | | |
|---|---|---|
| F04B 49/02 | (2006.01) | |
| F04D 15/02 | (2006.01) | |
| F04B 17/03 | (2006.01) | |
| F04B 49/06 | (2006.01) | |
| F04B 49/20 | (2006.01) | |

(Continued)

(52) U.S. Cl.
CPC ............ *F04B 49/022* (2013.01); *F04B 17/03* (2013.01); *F04B 49/02* (2013.01); *F04B 49/065* (2013.01); *F04B 49/20* (2013.01); *F04D 15/0066* (2013.01); *F04D 15/0254* (2013.01); *B60W 10/30* (2013.01); *F04B 49/06* (2013.01)

(58) Field of Classification Search
CPC ........ F04B 49/02; F04B 49/022; F04B 49/02; F04B 49/065; F04D 15/0066; F04D 15/0254
See application file for complete search history.

(56) References Cited

U.S. PATENT DOCUMENTS

| | | | | |
|---|---|---|---|---|
| 8,366,405 B2 * | 2/2013 | Miyamura | ............... | F04C 28/12 417/212 |
| 9,109,596 B2 * | 8/2015 | Ohnishi | .................. | F04C 2/344 |

(Continued)

FOREIGN PATENT DOCUMENTS

| | | |
|---|---|---|
| JP | 2005-201225 A | 7/2005 |
| JP | 2005-207304 A | 8/2005 |

(Continued)

*Primary Examiner* — Patrick Hamo
(74) *Attorney, Agent, or Firm* — Oliff PLC

(57) ABSTRACT

A lubricating oil supply device for a vehicle includes an electric oil pump and an electronic control unit. The electronic control unit is configured to control the electric oil pump, determine whether or not lubricating oil needs to be supplied by the electric oil pump, control a drive duty of the electric oil pump to a first value when the ECU determines that lubricating oil needs to be supplied, and control the drive duty to a second value that is smaller than the first value when the ECU determines that lubricating oil does not need to be supplied. The electronic control unit is configured to perform duty variable control for controlling the drive duty to a third value, which is between the first value and the second value, during a predetermined changeover transition period, in changing over the drive duty from the first value to the second value.

13 Claims, 8 Drawing Sheets

(51) Int. Cl.
*F04D 15/00* (2006.01)
*B60W 10/30* (2006.01)

(56) References Cited

U.S. PATENT DOCUMENTS

| | | | |
|---|---|---|---|
| 2008/0139360 A1 | 6/2008 | Hayashi et al. | |
| 2013/0160465 A1* | 6/2013 | Broughton | F02C 7/12 60/797 |
| 2013/0164163 A1* | 6/2013 | Ohnishi | F04C 2/344 418/27 |
| 2014/0072456 A1* | 3/2014 | Watanabe | F04C 2/3442 417/218 |
| 2014/0072458 A1* | 3/2014 | Watanabe | F02M 39/02 417/290 |
| 2014/0119969 A1* | 5/2014 | Iijima | F04C 2/344 418/30 |
| 2014/0147322 A1* | 5/2014 | Saga | F04C 2/344 418/24 |
| 2014/0147323 A1* | 5/2014 | Watanabe | F04C 2/3442 418/27 |
| 2014/0219847 A1* | 8/2014 | Watanabe | F04C 2/3442 418/24 |
| 2015/0107686 A1* | 4/2015 | Watanabe | F01M 1/16 137/102 |
| 2015/0218983 A1* | 8/2015 | Watanabe | F04C 2/3442 210/130 |
| 2016/0069231 A1 | 3/2016 | Nishimine | |

FOREIGN PATENT DOCUMENTS

| | | |
|---|---|---|
| JP | 2013-193511 A | 9/2013 |
| JP | 2016-052844 A | 4/2016 |

\* cited by examiner

FIG. 4
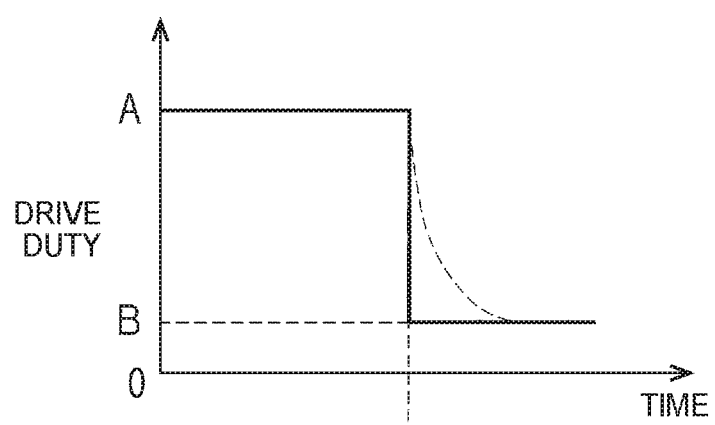
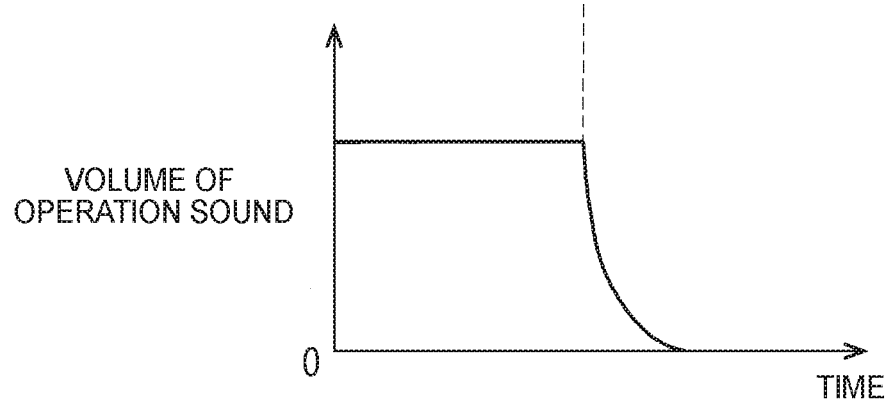

LUBRICATING OIL SUPPLY DEVICE AND LUBRICATING OIL SUPPLY CONTROL METHOD FOR VEHICLE

INCORPORATION BY REFERENCE

The disclosure of Japanese Patent Application No. 2016-133978 filed on Jul. 6, 2016 including the specification, drawings and abstract is incorporated herein by reference in its entirety.

BACKGROUND

1. Technical Field

The disclosure relates to a lubricating oil supply device that is provided with an electric oil pump to supply lubricating oil to a predetermined region such as a power transmission mechanism or the like of a vehicle, and a lubricating oil supply control method, and more particularly, to the control performed in stopping the electric oil pump.

2. Description of Related Art

In Japanese Patent Application Publication No. 2016-52844 (JP 2016-52844 A), there is described a lubricating oil supply device that is mounted in, for example, a hybrid vehicle having an engine and a motor for running, and that supplies hydraulic oil to the motor for running, a transmission and the like by operating an electric oil pump while the engine is stopped. In the lubricating oil supply device described in Japanese Patent Application Publication No. 2016-52844 (JP 2016-52844 A), a mechanical oil pump operates in response to the start of the engine. When the supply of lubricating oil from the electric oil pump becomes unnecessary, the drive duty of the electric oil pump is reduced (e.g., reduced to 15%) to stop the electric oil pump.

SUMMARY

By the way, the electric oil pump is stopped during the running of the vehicle, for example, when it becomes unnecessary to cool the motor for running due to a fall in the temperature thereof, when the supply of lubricating oil is temporarily stopped due to a decrease in the load applied to a gear of a power transmission mechanism or a fall in the rotational speed thereof, etc. as well as when the mechanical oil pump is operated in response to the start of the engine as described hereinbefore.

However, in a situation where the supply of lubricating oil to the motor for running and the power transmission mechanism is stopped, a vehicle interior is usually relatively quiet (the level of background noise is usually low). Therefore, when the operating electric oil pump is stopped as described hereinbefore, a passenger may develop a feeling of strangeness due to the sudden disappearance of the operation sound of the electric oil pump. The volume of the operation sound of the electric oil pump is not loud, but a driver tends to develop a feeling of strangeness when this volume suddenly changes independently of the driver's operation.

The disclosure provides a lubricating oil supply device and a lubricating oil supply control method for a vehicle that ensure that a passenger does not develop a feeling of strangeness, by performing control such that the volume of operation sound does not suddenly change in a vehicle interior, in substantially reducing the drive duty of an electric oil pump of the vehicle, for example, in stopping the electric oil pump.

A lubricating oil supply device for a vehicle according to a first aspect of the disclosure is equipped with an electric oil pump that supplies lubricating oil to a predetermined region of the vehicle, and an electronic control unit that is configured to control the electric oil pump. The electronic control unit is configured to determine whether or not lubricating oil needs to be supplied by the electric oil pump, and configured to control a drive duty of the electric oil pump to a first value when the electronic control unit determines that lubricating oil needs to be supplied, and control the drive duty to a second value that is smaller than the first value when the electronic control unit determines that lubricating oil does not need to be supplied. The electronic control unit is configured to perform duty variable control for controlling the drive duty to a third value, which is a value between the first value and the second value, during a predetermined changeover transition period, in changing over the drive duty from the first value to the second value.

In the aforementioned first aspect of the disclosure, when being substantially reduced, the drive duty of the electric oil pump is temporarily controlled to the value between the first value and the second value. That is, the aforementioned first aspect of the disclosure targets the lubricating oil supply device for the vehicle that is equipped with the electric oil pump that supplies lubricating oil to the predetermined region of the vehicle, and the electronic control unit that controls this electric oil pump. According to the lubricating oil supply device configured as described hereinbefore, in a situation where it is determined that lubricating oil needs to be supplied from the electric oil pump, for example, when the engine is stopped in a hybrid vehicle, etc., the electronic control unit controls the drive duty to the first value, and lubricating oil is supplied through the operation of the electric oil pump. On the other hand, in a situation where it is determined that the lubricating oil does not need to be supplied, the drive duty is controlled to the second value that is smaller than the first value, and the rotational speed of the electric oil pump falls, so the consumption of electric power is suppressed.

Besides, when the drive duty is thus changed over from the first value to the second value, duty variable control is performed to control the drive duty of the electric oil pump to the value (the third value) between the first value and the second value during the predetermined changeover transition period. Thus, the rotational speed of the electric oil pump slowly falls, and the volume of the operation sound thereof is restrained from suddenly changing, so the passenger does not tend to develop a feeling of strangeness. Incidentally, the third value may be constant or gradually decrease during the changeover transition period.

In the aforementioned first aspect of the disclosure, the electronic control unit may refrain from performing the duty variable control when a rotational speed of the electric oil pump is equal to or lower than a preset threshold. That is, when the rotational speed is equal to or lower than the threshold, the volume of the operation sound of the electric oil pump is low, so a feeling of strangeness does not tend to be developed even when the volume suddenly changes. Thus, when the operation of the electric oil pump becomes unnecessary, the amount of electric power consumption is further reduced by immediately lowering the rotational speed thereof.

In the aforementioned first aspect of the disclosure, the electronic control unit may shorten a time to changeover to the second value (the changeover transition period) as the rotational speed of the electric oil pump rises. This is because of the following reason. That is, when the rotational speed of the electric oil pump is higher than the threshold, duty variable control is performed as described hereinbefore in changing over the drive duty, thereby slowing down the fall in the rotational speed of the electric oil pump. This is because the volume of the operation sound of the electric oil pump increases and the shrillness of the tone thereof increases as the rotational speed of the electric oil pump rises.

That is, if the rotational speed of the electric oil pump slowly falls due to the performance of the duty variable control when the rotational speed of the electric oil pump is thus high and the tone of the operation sound thereof is shrill, the passenger of the vehicle tends to feel changes in tone of the operation sound resulting from changes in the rotational speed, as fluctuations in sound. Thus, with a view to preventing this from making the passenger develop a feeling of strangeness, the changeover transition period of the drive duty in duty variable control is shortened to prevent the fall in rotational speed of the electric oil pump from slowing down too much.

In the first aspect of the disclosure, the electronic control unit may refrain from performing the duty variable control when a vehicle speed is equal to or higher than a preset threshold. That is, when the vehicle speed is equal to or higher than a certain level, the operation sound of the electric oil pump is muffled by the running noise (wind noise, road noise and the like) of the vehicle etc. Therefore, the passenger does not tend to develop a feeling of strangeness even when the volume of the operation sound suddenly changes. Thus, in this case, the amount of electric power consumption is further reduced by immediately lowering the rotational speed of the electric oil pump.

In the aforementioned first aspect of the disclosure, the vehicle may be driven by an engine. The lubricating oil supply device may be equipped with a mechanical oil pump that supplies lubricating oil to the predetermined region, and an oil passage where pressure oil discharged by this mechanical oil pump merges with pressure oil discharged by the electric oil pump. Besides, the electronic control unit may be configured to determine that lubricating oil does not need to be supplied by the electric oil pump in a plurality of situations including that the engine is in operation. The electronic control unit may be configured to refrain from performing the duty variable control when the electronic control unit determines that lubricating oil does not need to be supplied, in response to start of the engine at a time of driving of the electric oil pump and the drive duty is changed over from the first value to the second value. Besides, the electronic control unit may refrain from performing the duty variable control or make the changeover transition period shorter than when the drive duty is changed over in situations other than the plurality of situations, when the electronic control unit determines that lubricating oil does not need to be supplied in response to start of the engine at a time of driving of the electric oil pump and the drive duty is changed over from the first value to the second value.

That is, when the engine starts, the mechanical oil pump that is driven thereby generates an oil pressure. Therefore, if the electric oil pump is also in operation, the oil pressure generated by the mechanical oil pump and the oil pressure generated by the electric oil pump may interfere with each other to cause an unexpected inconvenience. Thus, when the drive duty is changed over in response to the start of the engine, it is appropriate to stop the electric oil pump early by refraining from performing duty variable control or making the changeover transition period shorter than in the other situations.

A lubricating oil supply device for a vehicle according to a second aspect of the disclosure is equipped with an electric oil pump that supplies lubricating oil to a predetermined region of the vehicle, and an electronic control unit that is configured to control the electric oil pump. The electronic control unit is configured to determine whether or not lubricating oil needs to be supplied by the electric oil pump, and configured to control a drive duty of the electric oil pump to a first value when the electronic control unit determines that lubricating oil needs to be supplied, and control the drive duty to a second value that is smaller than the first value when the electronic control unit determines that lubricating oil does not need to be supplied. The electronic control unit is configured to perform duty variable control for controlling the drive duty such that a predetermined changeover transition period is required until the drive duty makes a transition from the first value to the second value, in changing over the drive duty from the first value to the second value.

A lubricating oil supply control method for a vehicle according to a third aspect of the disclosure is a lubricating oil supply control method for a vehicle that uses a lubricating oil supply device that is equipped with an electric oil pump that supplies lubricating oil to a predetermined region of the vehicle, and an electronic control unit that is configured to control the electric oil pump. The method includes determining, by the electronic control unit, whether or not oil needs to be supplied, controlling, by the electronic control unit, a drive duty to a first value when the electronic control unit determines that oil needs to be supplied, and controlling, by the electronic control unit, the drive duty to a second value that is smaller than the first value when the electronic control unit determines that oil does not need to be supplied, and performing, by the electronic control unit, duty variable control for controlling the drive duty to a third value between the first value and the second value, during a predetermined changeover transition period in changing over the drive duty from the first value to the second value.

As described above, the lubricating oil supply device for the vehicle according to the disclosure determines that lubricating oil does not need to be supplied during the operation of the electric oil pump, performs duty variable control in changing over the drive duty thereof from the first value to the second value, and controls the drive duty to the third value between the first value and the second value during the predetermined changeover transition period. Thus, the rotational speed of the electric oil pump slowly falls. It is therefore possible to restrain the volume of the operation sound of the electric oil pump from suddenly changing, and ensure that the passenger does not tend to develop a feeling of strangeness.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a graph showing how the rotational speed of a pump and the volume of operation sound change in the case where the drive duty is immediately changed over to stop an EOP;

DETAILED DESCRIPTION OF EMBODIMENTS

Figure 1:
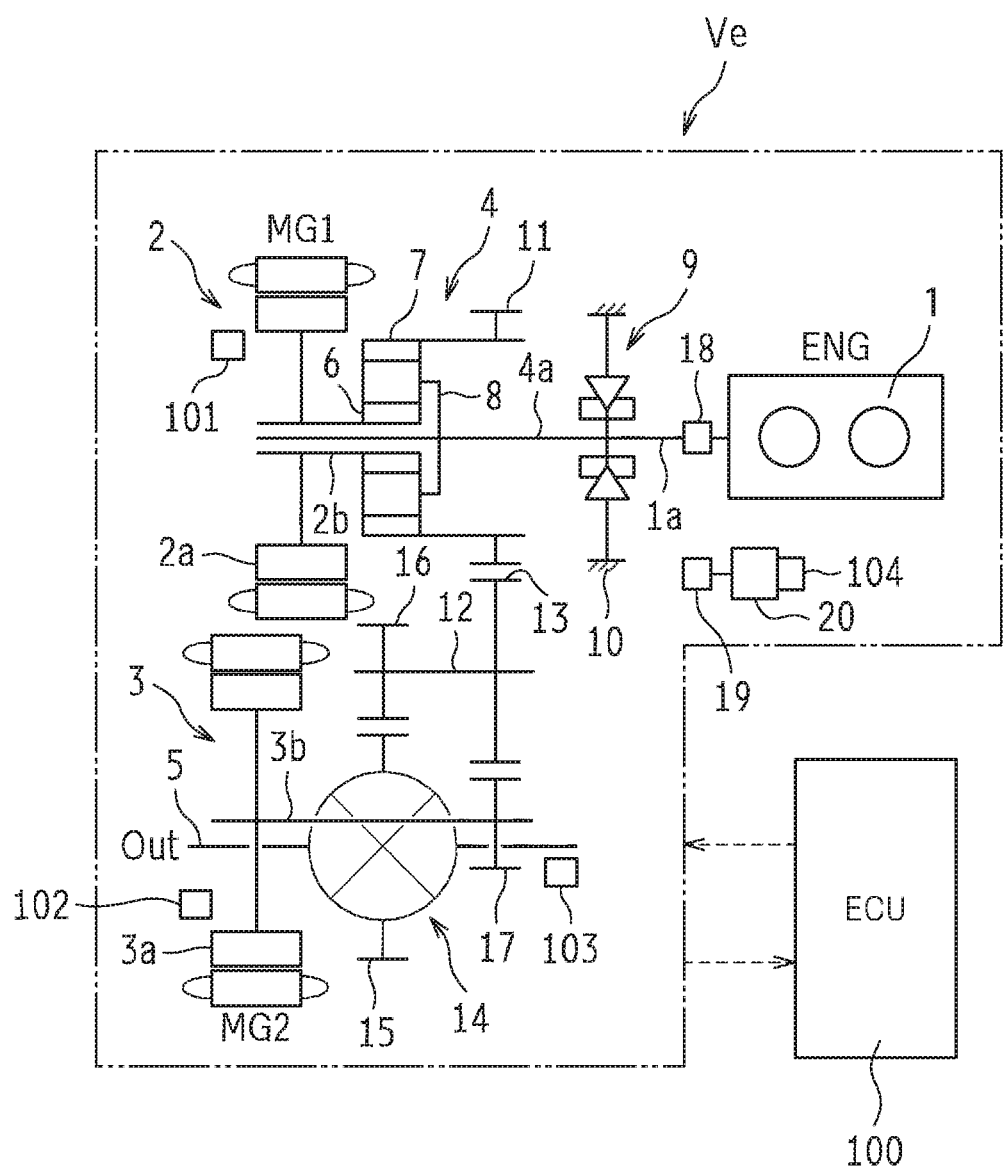
FIG. 1 is a view showing an exemplary drive system of a vehicle according to one of the embodiments of the disclosure.

One of the embodiments of the disclosure in which the disclosure is applied to a hybrid vehicle as an example of the disclosure will be described hereinafter. As schematically shown in FIG. 1, a vehicle Ve is mounted with an engine (ENG) 1, a first motor-generator (MG1) 2 and a second motor-generator (MG2) 3 as driving force sources. An output of the engine 1 is split and transmitted to the first motor-generator 2 side and a drive shaft 5 side by a power split device 4. Besides, it is also possible to supply an electric power generated by the first motor-generator 2 to the second motor-generator 3, and apply an output thereof to the drive shaft 5.

The adjustment of the output of the engine 1, the activation and stop of the engine 1, and the like are controlled by an ECU 100 that will be described later. For example, in the case of a gasoline engine, the throttle opening degree thereof, the amount of fuel supplied thereto, the ignition timing thereof and the like are controlled. Each of the first motor-generator 2 and the second motor-generator 3 is a motor having an electric power generation function (e.g., a permanent magnet-type synchronous electric motor or the like), and is connected to a battery (not shown) via an inverter (not shown). The rotational speed and torque of each of the first motor-generator 2 and the second motor-generator 3, or the changeover between the function as a motor and the function as an electric power generator, and the like are controlled. The motor-generators 2 and 3 are fitted with temperature sensors 101 and 102 respectively.

The power split device 4 is constituted by a differential mechanism having three rotary elements, concretely, a single pinion-type planetary gear mechanism having a sun gear 6, a ring gear 7 and a carrier 8. This planetary gear mechanism is arranged on the same axis of rotation as an output shaft 1a of the engine 1, and the first motor-generator 2 is coupled to the sun gear 6. Besides, this first motor-generator 2 has a rotor 2a and a shaft 2b. The shaft 2b rotates integrally with the rotor 2a, and is coupled to the sun gear 6 of the power split device 4.

Then, the ring gear 7 as an internal gear is arranged concentrically with the sun gear 6. A pinion gear that meshes with this sun gear 6 and this ring gear 7 is held by the carrier 8 rotatably around its own axis and around the carrier 8. An input shaft 4a of the power split device 4 is coupled to this carrier 8, and an end portion of the output shaft 1a of the engine 1 is coupled to an end portion of the input shaft 4a via a one-way brake 9.

The foregoing one-way brake 9 is provided between the output shaft 1a or the carrier 8 and a fixed member 10 such as a housing or the like. Besides, the one-way brake 9 is configured to be engaged to stop the output shaft 1a or the carrier 8 from rotating when a torque in the direction opposite to a rotational direction of the engine 1 is applied thereto. By using this one-way brake 9, the output shaft 1a or the carrier 8 can be stopped from rotating in accordance with an application direction of torque.

Besides, a drive gear 11 as an external gear is formed integrally with an outer peripheral region of the ring gear 7 of the planetary gear mechanism, and meshes with a counter driven gear 13 that is provided at an end portion of a countershaft 12. A counter drive gear 16 that meshes with a ring gear 15 of a differential gear 14 as a final reduction gear is provided at the other end portion (on the left side in FIG. 1) of this countershaft 12.

That is, the ring gear 7 of the power split device 4 transmits a torque to the drive shaft 5 via a gear train consisting of the drive gear 11, the countershaft 12, the counter driven gear 13 and the counter drive gear 16 and the differential gear 14. Besides, a drive shaft rotational speed sensor 103 for detecting a rotational speed of the drive shaft 5 is provided. There is adopted a configuration in which a torque output by the second motor-generator 3 can be added to the torque transmitted to the drive shaft 5 from the power split device 4 in this manner.

That is, the second motor-generator 3 is arranged such that a shaft 3b thereof, which rotates integrally with a rotor 3a thereof, extends parallel to the countershaft 12. A reduction gear 17 that is coupled to this shaft 3b meshes with the counter driven gear 13. That is, the drive shaft 5 and the second motor-generator 3 are coupled to the ring gear 7 of the power split device 4, via the gear train as described hereinbefore or the reduction gear 17.

An oil supply system will be described. The vehicle Ve according to the present embodiment is provided with two oil pumps, namely, a first oil pump 18 and a second oil pump 19 to cool the first motor-generator 2 and the second motor-generator 3 and lubricate and cool the planetary gear mechanism in the power split device 4. The first oil pump 18 is a conventionally employed common mechanical oil pump (which will be referred to hereinafter as an MOP 18), and is driven by the operating engine 1 to supply oil.

On the other hand, the second oil pump 19 is an electric oil pump (which will be referred to hereinafter as an EOP 19) that is provided to supply oil when the engine 1 is stopped and the MOP 18 is out of operation, and that is driven by a pump motor 20 as an electric motor. Incidentally, the pump motor 20 is integrally provided with a position sensor of a rotor (which will be referred to hereinafter as a pump rotational speed sensor 104), for example, a Hall sensor, an encoder or the like.

Figure 2:
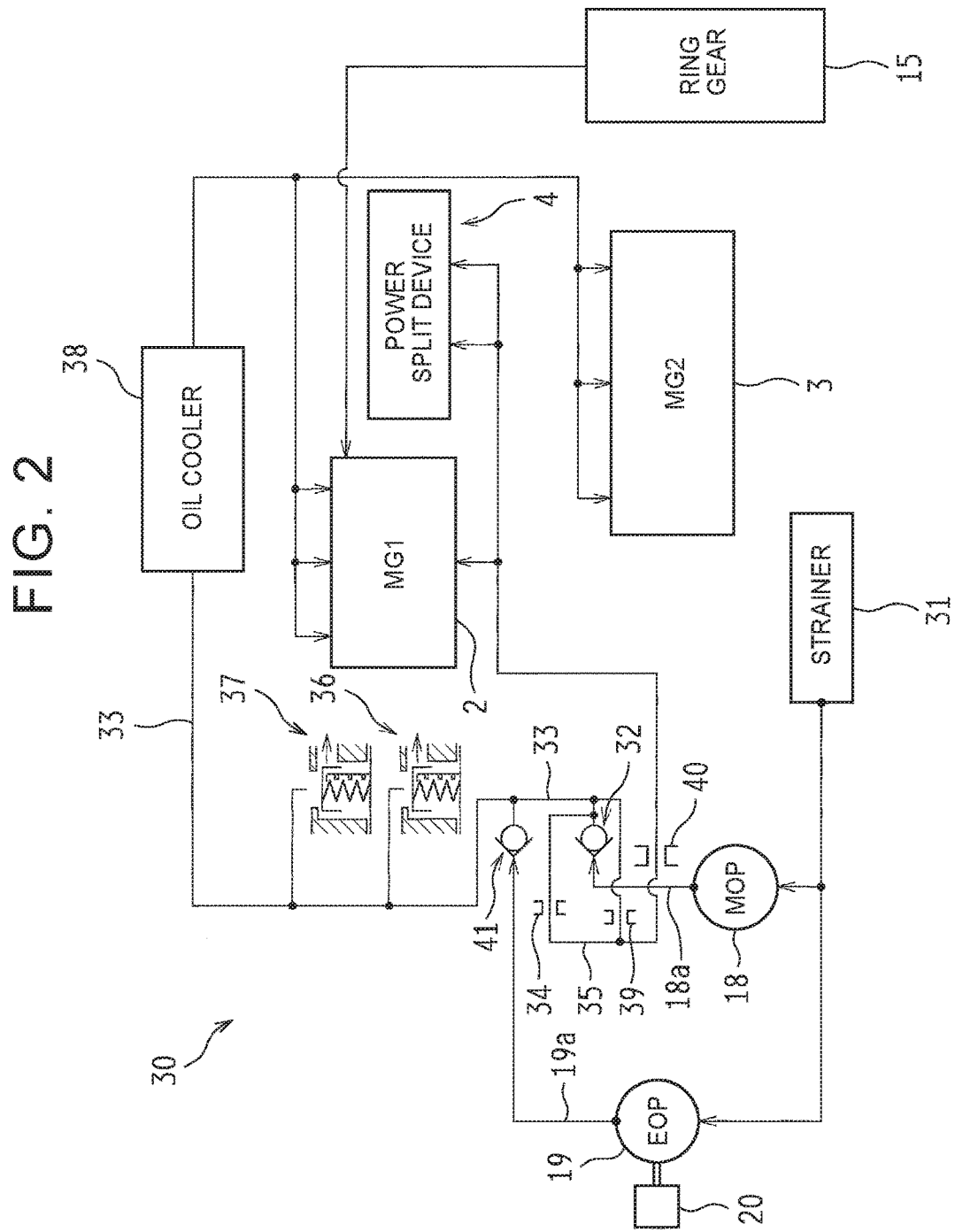
FIG. 2 is a view showing an exemplary oil supply system of the vehicle shown in FIG. 1.

FIG. 2 shows an oil supply system 30 extending from the MOP 18 and the EOP 19 to lubricated portions of the first motor-generator 2, the second motor-generator 3 and the planetary gear mechanism of the power split device 4. The MOP 18 sucks oil from an oil pan (not shown) via a strainer 31, and discharges oil from a discharge port 18a. The discharge port 18a of the MOP 18 is coupled to an oil passage 33 via a check valve 32. Besides, the discharge port 18a of the MOP 18 communicates with an oil passage 35 via the check valve 32 and an orifice 34. The check valve 32 allows oil to flow from the discharge port 18a toward the oil passage 33 and the oil passage 35.

A relief valve 36 and a relief valve 37 are connected to one end of the oil passage 33, which communicates with the lubricated portions of the first motor-generator 2 and the second motor-generator 3 via an oil cooler 38. These lubricated portions are regions that are required to be lubricated and cooled by oil, for example, coil ends, rotational slide portions and the like of the respective motor-generators 2 and 3. Incidentally, the other end of the oil passage 33 communicates with the oil passage 35 via an orifice 39.

The relief valve 36 and the relief valve 37 are connected to the oil passage 33 except at both ends thereof. The relief valve 36 opens to discharge oil when the oil pressure of the oil passage 33 exceeds a predetermined pressure. The relief valve 37 is a supplementary relief valve that functions instead of the relief valve 36, for example, when the relief valve 36 breaks down. The oil cooler 38 is provided in the oil passage 33 except at both the ends thereof, and cools the oil flowing through the oil passage 33.

The oil passage 35 is coupled at one end thereof to a discharge side of the check valve 32, and communicates at the other end thereof with the lubricated portions of the first motor-generator 2 and the lubricated portions of the power split device 4 via an orifice 40. The lubricated portions of the power split device 4 are regions (predetermined regions of the vehicle Ve) that are required to be lubricated and cooled by oil, for example, meshing regions, rotational slide regions and the like of the gears (the pinion gear in particular) in the planetary gear mechanism constituting the power split device 4.

Incidentally, in the present embodiment, the oil stored in the oil pan as well as the oil supplied via the oil passage 33 as described hereinbefore is scooped up and supplied to the lubricated portions of the second motor-generator 3, for example, when the ring gear 15 of the differential gear 14 rotates.

Besides, the EOP 19, which is provided in parallel with the MOP 18, sucks oil via the strainer 31 as is the case with the MOP 18, and discharges oil from a discharge port 19a. The discharge port 19a of the EOP 19 is coupled to the above-mentioned oil passage 33 via a check valve 41 that allows oil to flow out from the discharge port 19a. In consequence, the lubricated portions can be supplied with oil by the EOP 19 even when the MOP 18 cannot be driven while the engine 1 is stopped.

The ECU will be described. The vehicle Ve is mounted with an electronic control unit 100 (the ECU 100) to perform operation control of the engine 1, rotation control of the first motor-generator 2 and the second motor-generator 3, operation control of the EOP 19 and the like as described hereinbefore. This ECU 100 is mainly constituted by a microcomputer, and is configured to perform a computation through the use of input data and data stored in advance, and output a result of the computation as a control command signal.

That is, the ECU 100 appropriately operates or stops the engine 1, the first motor-generator 2 and the second motor-generator 3 to perform control such that good energy efficiency or good fuel economy is achieved. In concrete terms, the ECU 100 appropriately selects "an HV mode" in which the vehicle Ve is caused to run at least by the output of the engine 1, and "an EV mode" in which the vehicle Ve is caused to run by the output of at least one of the first motor-generator 2 and the second motor-generator 3 with the engine 1 stopped from being operated.

The foregoing "EV mode" is classified into "a first EV mode" in which the vehicle Ve is caused to run by the output of the second motor-generator 3, and "a second EV mode" in which the vehicle Ve is caused to run by the outputs of both the motor-generators, namely, the first motor-generator 2 and the second motor-generator 3. The ECU 100 selects each of the modes in accordance with a running state of the vehicle Ve (a vehicle speed and a required driving force in FIG. 3) with reference to, for example, a control map as shown in FIG. 3.

Figure 3:
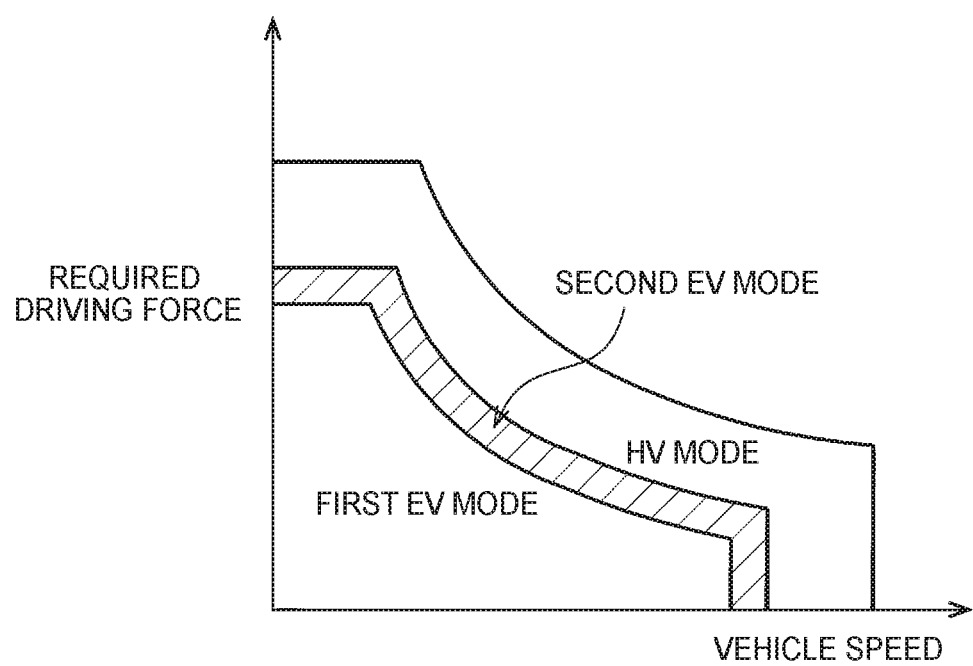
FIG. 3 is an image view showing an exemplary control map for selecting a mode in accordance with a running state of the vehicle (a vehicle speed and a required driving force)

As is apparent from FIG. 3, "the first EV mode" is established in a region where the vehicle speed is relatively low and the required driving force is relatively small, and the second motor-generator 3 is controlled in such a manner as to rotate in a positive direction (a rotational direction of the output shaft 1a of the engine 1) as a motor, and output a torque. Then, the vehicle Ve is caused to run by the output torque. Besides, "the second EV mode" is established in a region where the vehicle speed is higher and the required driving force is larger than in "the first EV mode" (hatched in the drawing), and the vehicle Ve is caused to run by the outputs of both the first motor-generator 2 and the second motor-generator 3.

In this "second EV mode", the second motor-generator 3 rotates in the positive direction as a motor in the same manner as described hereinbefore, and the first motor-generator 2 rotates in a negative direction (in the direction opposite to the rotational direction of the output shaft 1a of the engine 1) as a motor. In this case, a torque in the negative direction is applied to the output shaft 1a of the engine 1. Therefore, the one-way brake 9 is engaged. Thus, the vehicle Ve can thereby be efficiently caused to run by the output torques of both the first motor-generator 2 and the second motor-generator 3, with the engine 1 stopped from rotating.

In the case where a changeover among the modes is thus made in accordance with the running state of the vehicle Ve, the engine 1 is stopped in "the EV mode" as described hereinbefore, so oil cannot be supplied from the MOP 18. In "the first EV mode" as "the EV mode", oil needs to be supplied to the second motor-generator 3. However, as described above, the ring gear 15 of the differential gear 14 scoops up oil, so that oil can be supplied.

On the other hand, in "the second EV mode", a large load is applied to the planetary gear mechanism (the pinion gear in particular) of the power split device 4 in addition to the enhanced necessity to cool the first motor-generator 2 and the second motor-generator 3, so the necessity to lubricate and cool the planetary gear mechanism of the power split device 4 is enhanced. Thus, in the present embodiment, in "the second EV mode" in which the engine 1 is stopped, the EOP 19 is operated when the temperatures of the first motor-generator 2 and the second motor-generator 3 are high, when the load of the planetary gear mechanism of the power split device 4 is large, etc.

Incidentally, in the case where the vehicle Ve is a plug-in hybrid vehicle (a PHV) that can charge the battery with an electric power supplied from an external electric power supply, the frequency of selection of "the EV mode" as described hereinbefore is higher than in the case of a normal hybrid vehicle (an HV), so the necessity to generate an oil pressure by the EOP 19 is further enhanced. Besides, even in the case where "the first EV mode" is set, when a relatively large-capacity battery is mounted as in the case of, for example, the PHV, the continuous operation time in "the first EV mode" is long, so it may become necessary to lubricate and cool the planetary gear mechanism of the power split device 4 by the EOP 19 as in the case where "the second EV mode" is set.

Stop control of the EOP will be described. As described hereinbefore, in the present embodiment, the EOP 19 is operated in a predetermined situation where the engine 1 is stopped, such as "the second EV mode". On the other hand, the EOP 19 is stopped in a predetermined situation, for example, when the engine 1 is started to operate the MOP 18, when the temperatures of the first motor-generator 2 and the second motor-generator 3 fall, etc.

However, when the temperatures of the first motor-generator 2 and the second motor-generator 3 thus fall, a vehicle interior is usually relatively quiet (the level of background noise is low). If the operating EOP 19 is stopped as described hereinbefore, a passenger may develop a feeling of strangeness due to the sudden disappearance of operation sound thereof. That is, as indicated by a solid line in a graph in an upper stage of FIG. 4, the drive duty of the operating EOP 19 is usually controlled to a first value A (e.g., 60 to 80%).

Then, when the drive duty is changed over to a second value B (e.g., about 15%) to stop the EOP 19, the rotational speed of the EOP 19 suddenly falls as indicated by a broken line in a graph in the drawing, and the volume of the operation sound generated in the vehicle interior also suddenly decreases as indicated by a solid line in a graph in a lower stage of the drawing. The volume of the operation sound of the EOP 19 is originally not loud, but suddenly changes independently of a driver's own operation, so the driver tends to develop a feeling of strangeness.

In view of such circumstances, in the present embodiment, when changing over the drive duty of the EOP 19 from the first value A to the second value B with a view to stopping the operating EOP 19, the drive duty is controlled to a third value between the first value A and the second value B during a predetermined period (a changeover transition period) (i.e., duty variable control is performed). Thus, the rotational speed of the EOP 19 can be restrained from suddenly falling, and the noise level in the vehicle interior can be prevented from suddenly changing.

Figure 5:
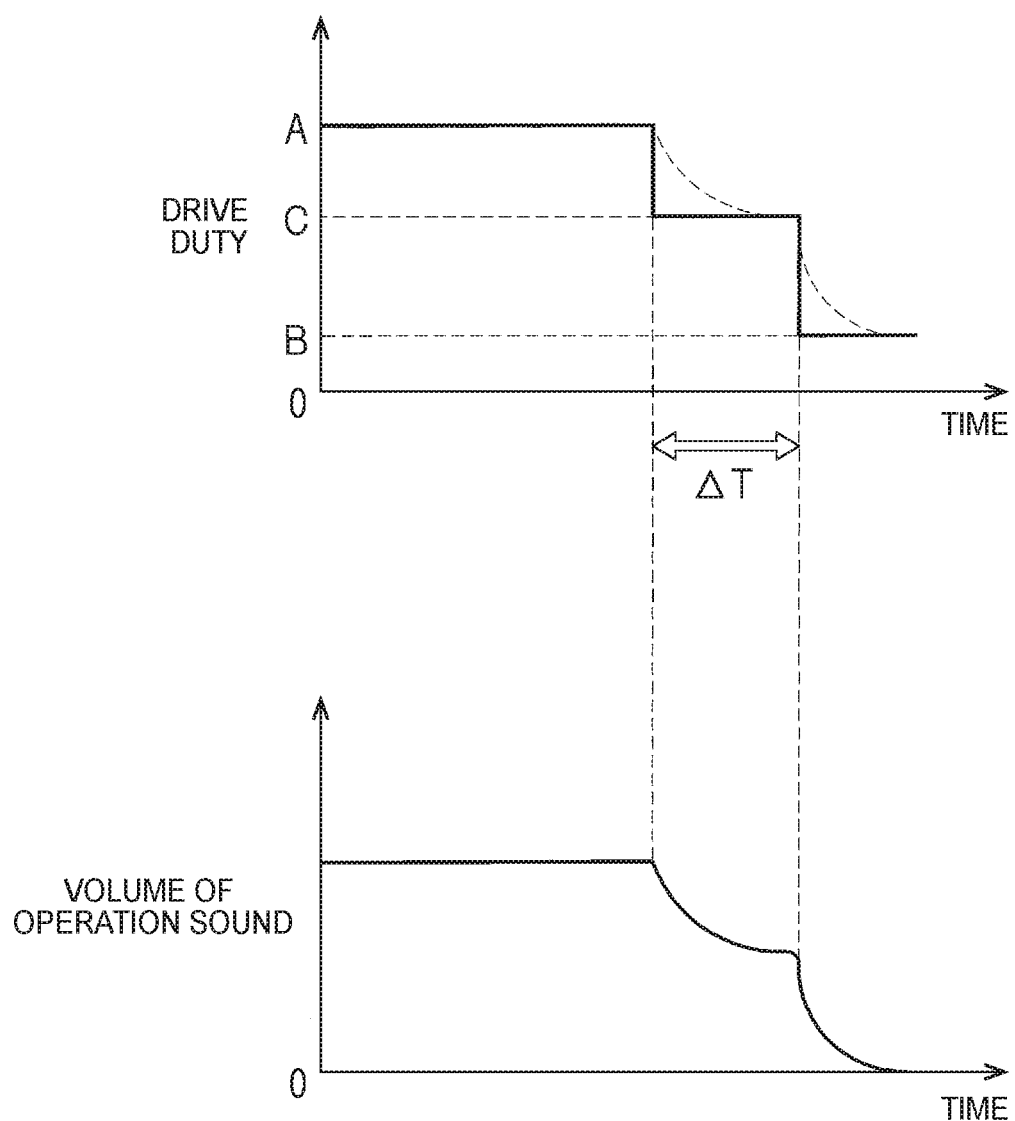
FIG. 5 is a view equivalent to FIG. 4 in the case where EOP control according to the present embodiment of the disclosure is performed.

That is, as indicated, for example, by a solid line in a graph in an upper stage of FIG. 5, the drive duty of the EOP 19 is changed over to the second value B upon the lapse of a changeover transition period ΔT after being changed over from the first value A to a third value C. Thus, the rotational speed of the EOP 19 slowly falls as indicated by a broken line in the graph in the drawing, so the volume of the operation sound generated in the vehicle interior gently changes as indicated by a solid line in a graph in a lower stage of the drawing.

A concrete procedure of the control of the EOP 19 in the present embodiment will be described hereinafter with reference to a flowchart of FIG. 6. This control routine is repeatedly executed at predetermined timings (e.g., at intervals of a predetermined time) in the ECU 100, for example, while an ignition switch or a power switch of the vehicle Ve is on. First of all, in step ST1 after the start of the control routine, it is determined whether or not oil needs to be supplied by the EOP 19.

The result of the determination in step ST1 is affirmative, for example, if one of the following conditions (1) and (2) is fulfilled when the engine 1 is stopped and no oil is supplied from the MOP 18.

(1) Each of the temperatures of the first motor-generator 2 and the second motor-generator 3 is higher than a predetermined temperature, the first motor-generator 2 and the second motor-generator 3 need to be cooled by oil, the vehicle speed is equal to or higher than a predetermined vehicle speed, and it is considered that the passenger finds it difficult to hear the operation sound of the EOP 19. (2) "The second EV mode" is established, the planetary gear mechanism of the power split device 4 needs to be lubricated and cooled, and the vehicle speed is equal to or higher than the predetermined vehicle speed.

Incidentally, the determinations on the temperatures of the first motor-generator 2 and the second motor-generator 3 are made based on the outputs of the temperature sensors 101 and 102 respectively, and the determination on the vehicle speed is made based on the output of the drive shaft rotational speed sensor 103. Besides, the determination on the necessity to lubricate and cool the planetary gear mechanism is made based on the magnitude of the load applied to the pinion thereof, for example, the output and rotational speed of the first motor-generator 2.

Then, if one of the conditions (1) and (2) is fulfilled, the result of the determination in step ST1 is affirmative (YES), a transition to step ST2 is made to output a control command signal to the EOP 19 to start operation thereof, and the routine is temporarily ended. That is, the ECU 100 controls the drive duty of the EOP 19 to the first value. Thus, the pump motor 20 of the EOP 19 rotates at, for example, 60 to 80% of a rated output thereof.

On the other hand, if neither the condition (1) nor the condition (2) is fulfilled in the foregoing step ST1 and the result of the determination therein is negative (NO in ST1), a transition to step ST3 is made to determine whether or not a performance flag of duty variable control is off. Then, if the flag is on, the result of the determination in step ST3 is negative (NO in ST3), and a transition to step ST8, which will be described later, is made. On the other hand, if the flag is off, the result of the determination in step ST3 is affirmative (YES in ST3), and a transition to step ST4 is made.

In this step ST4, it is determined whether to perform duty variable control or not. The result of this determination is affirmative, for example, if all the following conditions (a) to (c) are fulfilled.

(a) The rotational speed of the EOP 19 is higher than a preset threshold. That is, the operation sound of the EOP 19 is equal to or louder than a certain level, and it is considered that the passenger develops a feeling of strangeness when the volume of the operation sound suddenly changes. (b) The vehicle speed is lower than a preset threshold. That is, the running noise (wind noise, road noise and the like) of the vehicle Ve is low, and the level of background noise is low, so it is considered that the passenger develops a feeling of strangeness when the volume of the operation sound of the EOP 19 suddenly changes. (c) The start of the engine 1 (i.e., the start of the operation of the MOP 18) does not make the operation of the EOP 19 unnecessary. In other words, the supply of oil from the EOP 19 becomes unnecessary due to, for example, a fall in the temperature of each of the first motor-generator 2 and the second motor-generator 3 or a decrease in the load applied to the planetary gear mechanism of the power split device 4.

Incidentally, the determination on the rotational speed of the EOP 19 (which will be referred to also as a pump rotational speed) is made based on the output of the pump rotational speed sensor 104, and the determination on the vehicle speed is made based on the output of the drive shaft rotational speed sensor 103. Besides, for the following reason, duty variable control is not performed when the start of the engine 1 makes the operation of the EOP 19 unnecessary.

That is, as described above with reference to FIG. 2, the oil supply system 30 according to the present embodiment is configured such that the oil discharged by the MOP 18 and the oil discharged by the EOP 19 merge with each other in the oil passage 33. Therefore, when oil is simultaneously discharged from the MOP 18 and the EOP 19, an unexpected inconvenience, for example, unstable operation of the check valve 32 and the check valve 41 or the like may be caused due to the interference of the flow of the oil.

Thus, in the present embodiment, when the EOP 19 is stopped in response to the start of the EOP 19, duty variable control is not performed, and the drive duty is immediately changed over to the second value. Thus, the interference of the flow of the oil discharged by the MOP 18 and the flow of the oil discharged by the EOP 19 as a result of the simultaneous generation of oil pressures by the MOP 18 and the EOP 19 can be avoided, and oil can be appropriately supplied to the lubricated portions.

Then, if one of the conditions (a) to (c) is not fulfilled, the result of the determination in step ST4 is negative (NO), and a transition to step ST5 is made to output a control command signal to the EOP 19 such that the operation thereof is stopped. The EOP 19 according to the present embodiment is configured such that the pump motor 20 stops rotating when the drive duty is controlled to, for example, 0 to 15%. In this case, therefore, the drive duty of the EOP 19 is controlled to, for example, the second value, which is approximately equal to 15%. Thus, the pump motor 20 stops, and the EOP 19 does not discharge oil.

Then, a transition to step ST6 is made to turn off the performance flag of the duty variable control and end the routine. That is, if duty variable control is not performed when it is determined that oil does not need to be supplied by the EOP 19, the drive duty of the EOP 19 is immediately changed over from the first value corresponding to normal operation to the second value corresponding to stop. Thus, the amount of electric power consumption is reduced.

In contrast, if all the conditions (a) to (c) are fulfilled in the foregoing step ST4 and the result of the determination therein is affirmative (YES), a transition to step ST7 is made to turn on the performance flag of duty variable control. After that, a transition to step ST8 is made. Then, it is determined whether or not the present time is in a predetermined period (in a changeover transition period) that is set in the course of a changeover in the drive duty of the EOP 19 from the first value to the second value.

Figure 7:
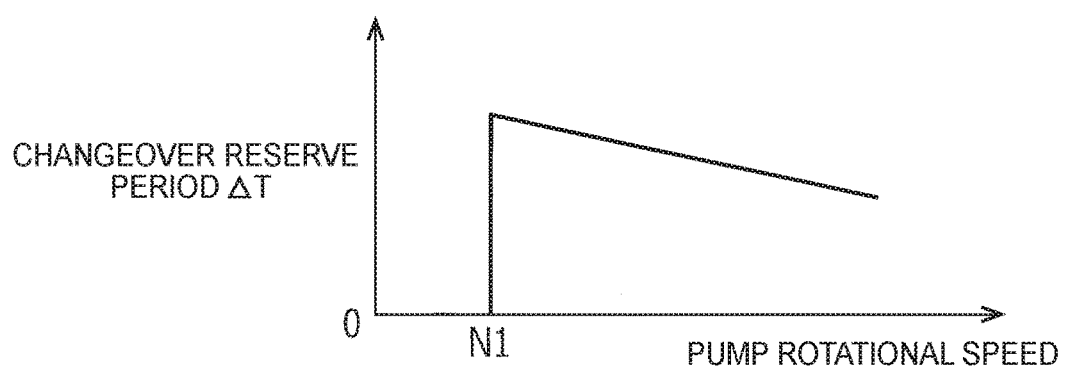
FIG. 7 is an image view showing an exemplary table that sets the length of a changeover transition period in accordance with the rotational speed of the pump.

As described above with reference to FIG. 5, this changeover transition period is a period in which the drive duty of the EOP 19 is controlled to the third value between the first value and the second value to restrain the driver from developing a feeling of strangeness due to a sudden change in the volume of operation sound resulting from a sudden fall in the rotational speed of the EOP 19. Therefore, the changeover transition period is set in advance through an experiment, a simulation or the like with the aid of an actual vehicle. As shown in FIG. 7 in an exemplary manner, a table corresponding to the rotational speed of the pump is provided.

As shown in the drawing, when the rotational speed of the pump is equal to or lower than a preset threshold N1, the operation sound of the EOP 19 is rather low, so there is no need to perform duty variable control, and the length of the changeover transition period ΔT is equal to 0. On the other hand, when the rotational speed of the pump is higher than the threshold N1, the changeover transition period ΔT is set in such a manner as to shorten as the rotational speed rises. This is because the volume of the operation sound of the EOP 19 increases and the shrillness thereof increases as the rotational speed of the pump rises.

If duty variable control is performed to slow down the fall in the rotational speed of the pump when the rotational speed of the pump is high as described above and the operation sound of the pump is shrill, the passenger tends to feel changes in tone of the operation sound resulting from changes in the rotational speed of this pump, as fluctuations in sound. Thus, with a view to preventing this from making the passenger develop a feeling of strangeness, the changeover transition period of the drive duty in duty variable control is made short, so that the fall in rotational speed of the pump does not become too slow.

If the changeover transition period thus set has not elapsed, it is affirmatively determined in the foregoing step ST8 that the present time is in the changeover transition period (YES), a transition to step ST9 is made to control the drive duty of the EOP 19 to the third value (e.g., 30 to 50%) between the first value and the second value, and the routine is temporarily ended. Thus, the pump motor 20 of the EOP 19 rotates at, for example, 30 to 50% of a rated output thereof.

Incidentally, the third value of the drive duty is set in advance as a value that does not make the passenger develop a feeling of strangeness even if the operation sound changes due to a fall in the rotational speed of the pump as a result of a changeover from the first value when the changeover is made, through an experiment, a simulation or the like with the aid of an actual vehicle. Besides, in the present embodiment, the third value is a constant value. However, the third value can also be changed in accordance with the rotational speed of the pump, for example, in such a manner as to increase as the first value increases.

Then, if the changeover transition period elapses while the rotational speed of the pump is restrained from suddenly falling after the drive duty of the EOP 19 is controlled to the third value, the result of the determination in the foregoing step ST8 is negative (NO), and a transition to the foregoing step S5 is made to change over the drive duty of the EOP 19 to the second value. Then, the performance flag of duty variable control is turned off in the foregoing step ST6, and the routine is ended.

That is, if duty variable control is performed when the EOP 19 is stopped, the drive duty of the EOP 19 is controlled to the third value between the first value and the second value during the predetermined changeover transition period, in changing over the drive duty of the EOP 19 from the first value to the second value. Thus, the rotational speed of the pump slowly falls, and the operation sound of the EOP 19 is restrained from suddenly changing. As a result, the passenger does not tend to develop a feeling of strangeness.

The routine of EOP control as described above is realized mainly through the execution of a control program of the pump motor 20 of the EOP 19 in the ECU 100. In consequence, according to the present embodiment, the ECU 100 functions as a control device that controls the EOP 19. Then, the ECU 100 constitutes a determination unit that determines whether or not oil needs to be supplied to the lubricated portions of the vehicle Ve by the EOP 19, by carrying out step ST1 of the flowchart shown in FIG. 6.

Figure 6:
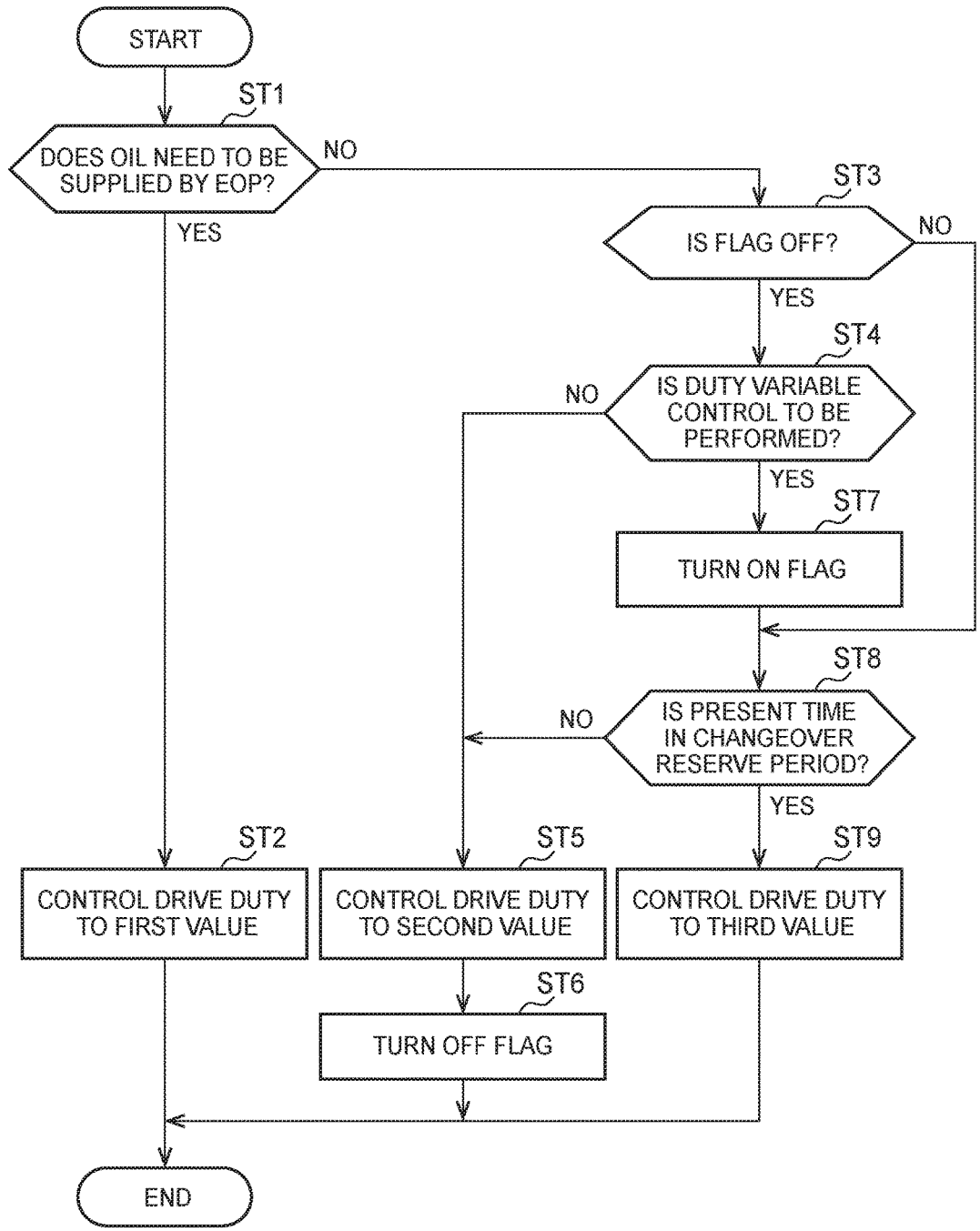
FIG. 6 is a flowchart showing a routine of EOP control according to the present embodiment of the disclosure.

Besides, the ECU 100 constitutes a duty control unit that controls the drive duty of the EOP 19 to the first value when it is determined that oil needs to be supplied, and that controls the drive duty of the EOP 19 to the second value when it is determined that oil does not need to be supplied, by carrying out steps ST2 to ST9 of the flowchart shown in FIG. 6. Then, as is apparent from steps ST4 to ST9, this duty control unit controls the drive duty to the third value between the first value and the second value for the predetermined changeover transition period, in changing over the drive duty from the first value to the second value.

Accordingly, the lubricating oil supply device for the vehicle according to the present embodiment can appropriately slow down the fall in the rotational speed of the pump, restrain the operation sound in the vehicle interior from suddenly changing, and ensure that the passenger does not tend to develop a feeling of strangeness, by first changing over the drive duty of the EOP 19 from the first value corresponding to normal operation to the third value and then changing over the drive duty of the EOP 19 to the second value after the lapse of the changeover transition period, in stopping the EOP 19.

Moreover, in the present embodiment, when the rotational speed of the pump is equal to or lower than the threshold and the operation sound of the EOP 19 is rather low or when the vehicle speed is equal to or higher than the threshold and the level of background noise resulting from running noise of the vehicle Ve is high, namely, in a situation where the passenger does not tend to develop a feeling of strangeness toward a sudden change in operation sound of the EOP 19 even when this sudden change happens, the drive duty of the EOP 19 is immediately changed over to the second value. Thus, the amount of electric power consumption is reduced.

Besides, the length of the changeover transition period in which the drive duty is held equal to the third value as described hereinbefore is shortened as the rotational speed of the EOP 19 rises. Therefore, even when the tone of operation sound changes as a result of a change in the rotational speed of the pump, the passenger does not tend to feel fluctuations in the tone. In consequence, it is also possible to ensure that the passenger does not tend to develop a feeling of strangeness toward a change in tone of operation sound as well as a sudden change in volume of operation sound.

Furthermore, in the present embodiment, when the EOP 19 is stopped in response to the start of the engine 1, the drive duty is immediately changed over from the first value to the second value. Thus, the flow of the oil discharged from the MOP 18 and the flow of the oil discharged from the EOP 19 do not interfere with each other, so the occurrence of an unexpected inconvenience can be avoided.

Other Embodiments

The above description of the embodiment is nothing more than an exemplification, and is not intended to limit the configuration, use or the like of the disclosure. For example, in the foregoing embodiment, as is apparent from the FIG. 5, in changing over the drive duty of the EOP 19 from the first value A to the second value B, the drive duty of the EOP 19 is first immediately changed over to the third value C therebetween, held constant during the changeover transition period ΔT, and then changed over to the second value B, but the disclosure is not limited thereto.

Figure 8A:
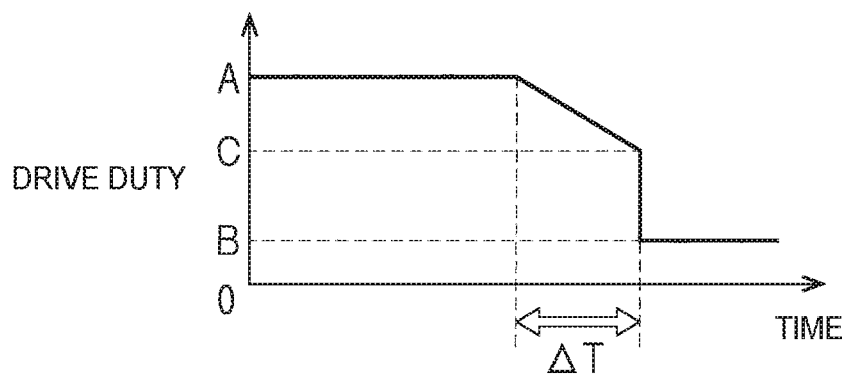
FIG. 8A is a view showing how the drive duty changes in duty variable control according to another one of the embodiments of the disclosure.
Figure 8B:
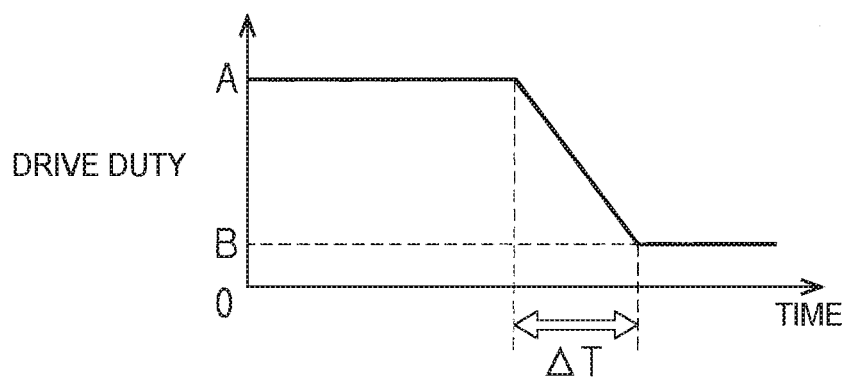
FIG. 8B is a view showing how the drive duty changes in duty variable control according to still another one of the embodiments of the disclosure.
Figure 8C:
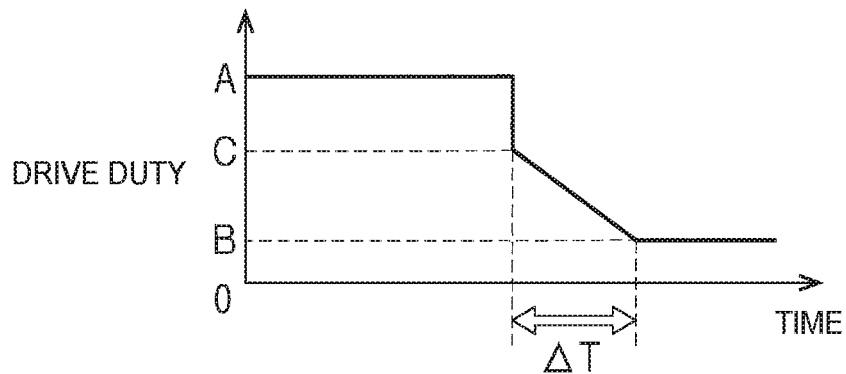
FIG. 8C is a view showing how the drive duty changes in duty variable control according to still another one of the embodiments of the disclosure.

That is, as shown in, for example, FIG. 8A, the drive duty may be gradually changed from the first value A to the third value C during the changeover transition period ΔT, and then changed over to the second value B. As shown in FIG. 8B, the drive duty may be gradually changed from the first value A to the second value B during the changeover transition period ΔT. Furthermore, as shown in FIG. 8C, the drive duty may be changed over from the first value A to the third value C and then gradually changed from the third value C to the second value B during the changeover transition period ΔT.

Besides, in the foregoing embodiment, in step ST4 in the flowchart of FIG. 6, duty variable control is performed when all the conditions (a) to (c) are fulfilled. However, these conditions (a) to (c) are nothing more than an example, and the conditions for performing duty variable control can be arbitrarily set.

Besides, in the foregoing embodiment, in stopping the EOP 19 in response to the start of the engine 1, duty variable control is not performed, and the drive duty is immediately changed over from the first value to the second value. In other words, in this case, the changeover transition period in duty variable control is set to 0, but the disclosure is not limited thereto either. In stopping the EOP 19 in response to the start of the engine 1, the changeover transition period may be made shorter than in stopping the EOP 19 in the other situations (e.g., when the temperatures of the first motor-generator 2 and the second motor-generator 3 fall, etc.).

Furthermore, in the foregoing embodiment, the case where the disclosure is applied to the vehicle Ve that is equipped with the engine 1, the first motor-generator 2 and the second motor-generator 3 has been described, but the disclosure is not limited thereto, either. For example, the disclosure is also applicable to a hybrid vehicle that is equipped with a single motor-generator as well as an engine so that driving forces are transmitted through separate power transmission paths respectively. Alternatively, the disclosure is also applicable to an electric vehicle that is not mounted with an engine and that employs a motor as a driving force source.

The disclosure can restrain the passenger from developing a feeling of strangeness due to a sudden change in volume of the operation sound in the vehicle interior, for example, in stopping the electric oil pump. The disclosure exerts an excellent effect especially by being applied to the hybrid vehicle.

What is claimed is:

1. A lubricating oil supply device for a vehicle, the lubricating oil supply device comprising:
   an electric oil pump that supplies lubricating oil to a predetermined region of the vehicle; and
   a control unit configured to control the electric oil pump, the control unit being configured to:
      determine whether or not lubricating oil needs to be supplied by the electric oil pump;
      control a drive duty of the electric oil pump to a first value when the control unit determines that lubricating oil needs to be supplied, and control the drive duty to a second value that is smaller than the first value when the control unit determines that lubricating oil does not need to be supplied;
      perform duty variable control for controlling the drive duty to a third value, which is a value between the first value and the second value, during a predetermined changeover transition period, in changing over the drive duty from the first value to the second value; and
      refrain from performing the duty variable control when a rotational speed of the electric oil pump is equal to or lower than a preset threshold.

2. The lubricating oil supply device for the vehicle according to claim 1, wherein
   the control unit is configured to control the third value such that the third value gradually decreases during the changeover transition period.

3. The lubricating oil supply device for the vehicle according to claim 1, wherein the control unit is configured to control the third value such that the third value becomes constant during the changeover transition period.

4. A lubricating oil supply device for a vehicle, the lubricating oil supply device comprising:
an electric oil pump that supplies lubricating oil to a predetermined region of the vehicle; and
a control unit configured to control the electric oil pump, the control unit being configured to:
determine whether or not lubricating oil needs to be supplied by the electric oil pump;
control a drive duty of the electric oil pump to a first value when the control unit determines that lubricating oil needs to be supplied, and control the drive duty to a second value that is smaller than the first value when the control unit determines that lubricating oil does not need to be supplied;
perform duty variable control for controlling the drive duty to a third value, which is a value between the first value and the second value, during a predetermined changeover transition period, in changing over the drive duty from the first value to the second value; and
shorten the changeover transition period as a rotational speed of the electric oil pump rises.

5. A lubricating oil supply device for a vehicle, the lubricating oil supply device comprising:
an electric oil pump that supplies lubricating oil to a predetermined region of the vehicle; and
a control unit configured to control the electric oil pump, the control unit being configured to:
determine whether or not lubricating oil needs to be supplied by the electric oil pump;
control a drive duty of the electric oil pump to a first value when the control unit determines that lubricating oil needs to be supplied, and control the drive duty to a second value that is smaller than the first value when the control unit determines that lubricating oil does not need to be supplied;
perform duty variable control for controlling the drive duty to a third value, which is a value between the first value and the second value, during a predetermined changeover transition period, in changing over the drive duty from the first value to the second value; and
refrain from performing the duty variable control when a vehicle speed is equal to or higher than a preset threshold.

6. A lubricating oil supply device for a vehicle, the lubricating oil supply device comprising:
an electric oil pump that supplies lubricating oil to a predetermined region of the vehicle;
a control unit configured to control the electric oil pump, the control unit being configured to:
determine whether or not lubricating oil needs to be supplied by the electric oil pump;
control a drive duty of the electric oil pump to a first value when the control unit determines that lubricating oil needs to be supplied, and control the drive duty to a second value that is smaller than the first value when the control unit determines that lubricating oil does not need to be supplied; and
perform duty variable control for controlling the drive duty to a third value, which is a value between the first value and the second value, during a predetermined changeover transition period, in changing over the drive duty from the first value to the second value;
a mechanical oil pump that supplies lubricating oil to the predetermined region; and
an oil passage where pressure oil discharged by the mechanical oil pump merges with pressure oil discharged by the electric oil pump, wherein
the vehicle is driven by an engine,
the control unit is configured to determine that lubricating oil does not need to be supplied by the electric oil pump in a plurality of situations including that the engine is in operation, and
the control unit is configured to refrain from performing the duty variable control when the control unit determines that lubricating oil does not need to be supplied, in response to start of the engine at a time of driving of the electric oil pump and the drive duty is changed over from the first value to the second value.

7. A lubricating oil supply device for a vehicle, the lubricating oil supply device comprising:
an electric oil pump that supplies lubricating oil to a predetermined region of the vehicle; and
a control unit configured to control the electric oil pump, the control unit being configured to:
determine whether or not lubricating oil needs to be supplied by the electric oil pump;
control a drive duty of the electric oil pump to a first value when the control unit determines that lubricating oil needs to be supplied, and control the drive duty to a second value that is smaller than the first value when the control unit determines that lubricating oil does not need to be supplied; and
perform duty variable control for controlling the drive duty to a third value, which is a value between the first value and the second value, during a predetermined changeover transition period, in changing over the drive duty from the first value to the second value;
a mechanical oil pump that supplies lubricating oil to the predetermined region; and
an oil passage where pressure oil discharged by the mechanical oil pump merges with pressure oil discharged by the electric oil pump, wherein
the vehicle is driven by an engine,
the control unit is configured to determine that lubricating oil does not need to be supplied by the electric oil pump in a plurality of situations including that the engine is in operation,
the control unit is configured to make the changeover transition period shorter than when the drive duty is changed over in situations other than the plurality of the situations, when the control unit determines that lubricating oil does not need to be supplied in response to start of the engine at a time of driving of the electric oil pump and the drive duty is changed over from the first value to the second value.

8. The lubricating oil supply device for the vehicle according to claim 1, further comprising:
a mechanical oil pump that supplies lubricating oil to the predetermined region; and
an oil passage where pressure oil discharged by the mechanical oil pump merges with pressure oil discharged by the electric oil pump, wherein
the vehicle is driven by an engine, the control unit is configured to determine that lubricating oil does not need to be supplied by the electric oil pump in a plurality of situations including that the engine is in operation, and the control unit is configured to perform the duty variable control when all conditions, namely, a condition i) that a rotational speed of the electric oil pump is higher than a preset threshold, a condition ii) that a vehicle speed is lower than a preset threshold, and a condition iii) that start of the engine does not make operation of the electric oil pump unnecessary are fulfilled.

9. A lubricating oil supply device for a vehicle, the lubricating oil supply device comprising:

an electric oil pump that supplies lubricating oil to a predetermined region of the vehicle, and a control unit configured to control the electric oil pump, the control unit being configured to:

determine whether or not lubricating oil needs to be supplied by the electric oil pump;

control a drive duty of the electric oil pump to a first value when the control unit determines that lubricating oil needs to be supplied, and control the drive duty to a second value that is smaller than the first value when the control unit determines that lubricating oil does not need to be supplied; and perform duty variable control for controlling the drive duty such that a predetermined changeover transition period is required until the drive duty makes a transition from the first value to the second value, in changing over the drive duty from the first value to the second value; and refrain from performing the duty variable control when a rotational speed of the electric oil pump is equal to or lower than a preset threshold.

10. The lubricating oil supply device for the vehicle according to claim 9, wherein the control unit is configured to gradually change the drive duty from the first value to a third value, which is a value between the first value and the second value, during the changeover transition period, and change over the drive duty to the second value after lapse of the changeover transition period.

11. The lubricating oil supply device for the vehicle according to claim 9, wherein the control unit is configured to gradually change the drive duty from the first value to the second value during the changeover transition period.

12. The lubricating oil supply device for the vehicle according to claim 9, wherein the control unit is configured to first change over the drive duty from the first value to a third value, which is a value between the first value and the second value, and then gradually change the drive duty from the third value to the second value during the changeover transition period, in changing over the drive duty from the first value to the second value.

13. A lubricating oil supply control method for a vehicle that uses a lubricating oil supply device that is equipped with an electric oil pump that supplies lubricating oil to a predetermined region of the vehicle, and a control unit that is configured to control the electric oil pump, the lubricating oil supply control method comprising:

determining, by the control unit, whether or not oil needs to be supplied;

controlling, by the control unit, a drive duty to a first value when the control unit determines that oil needs to be supplied, and controlling, by the control unit, the drive duty to a second value that is smaller than the first value when the control unit determines that oil does not need to be supplied; and performing, by the control unit, duty variable control for controlling the drive duty to a value between the first value and the second value, during a predetermined changeover transition period in changing over the drive duty from the first value to the second value; and refraining from performing the duty variable control when a rotational speed of the electric oil pump is equal to or lower than a preset threshold.

* * * * *